(12) United States Patent  
Jorgensen et al.

(10) Patent No.: US 8,599,536 B1  
(45) Date of Patent: Dec. 3, 2013

(54) STACKABLE CUBE POWER DISTRIBUTION CENTER

(75) Inventors: Glenn F. Jorgensen, Ridgewood, NJ (US); Michael W. Kelly, Joliet, IL (US); Laura B. Patterson, legal representative, Joliet, IL (US)

(73) Assignee: JNT Technical Services, Inc., Little Ferry, NJ (US)

( * ) Notice: Subject to any disclaimer, the term of this patent is extended or adjusted under 35 U.S.C. 154(b) by 236 days.

(21) Appl. No.: 13/269,328

(22) Filed: Oct. 7, 2011

Related U.S. Application Data

(60) Provisional application No. 61/390,679, filed on Oct. 7, 2010.

(51) Int. Cl.
  *H02B 1/26* (2006.01)
(52) U.S. Cl.
  USPC ............................ 361/623; 361/625; 361/641
(58) Field of Classification Search
  None
  See application file for complete search history.

(56) References Cited

U.S. PATENT DOCUMENTS

| | | | | |
|---|---|---|---|---|
| 5,544,003 | A * | 8/1996 | Vaughan | 361/625 |
| 5,574,622 | A * | 11/1996 | Brown | 361/625 |
| 6,252,764 | B1 * | 6/2001 | Benson | 361/625 |
| 7,442,873 | B2 * | 10/2008 | McCormick et al. | 174/50 |
| 7,817,405 | B2 * | 10/2010 | Neumann et al. | 361/625 |
| 7,848,085 | B2 * | 12/2010 | Gerber | 361/625 |
| 8,084,686 | B2 * | 12/2011 | Ladewig et al. | 174/50 |
| 8,467,171 | B2 * | 6/2013 | Brown et al. | 361/625 |
| 2007/0230094 | A1 * | 10/2007 | Carlson | 361/625 |
| 2009/0109605 | A1 * | 4/2009 | Blake | 361/625 |

* cited by examiner

*Primary Examiner* — Boris Chervinsky
(74) *Attorney, Agent, or Firm* — Greer, Burns & Crain Ltd.

(57) ABSTRACT

A power transformer and electrical current distribution device has a 480 V power inlet receptacle, at least one 120 V or 240 V power outlet receptacle, a transformer for transforming 480 V current to at least one of 120 V and 240 V current, and a first housing and a second housing each containing at least some of the 480 V inlet receptacle, the outlet receptacle and the transformer. A first part of an electrical connector is provided at the first housing, and a second part of an electrical connector at the second housing to mate with the first part of the electrical connector. The first housing part and the second housing part are electrically connected and disconnected at the electrical connector to permit transport of the power transformer and electrical current distribution device in at least two pieces.

2 Claims, 19 Drawing Sheets

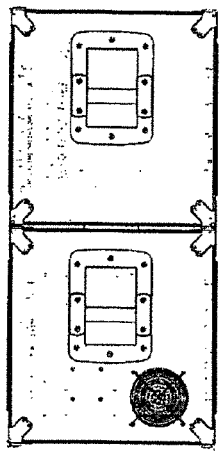
FIG. 24
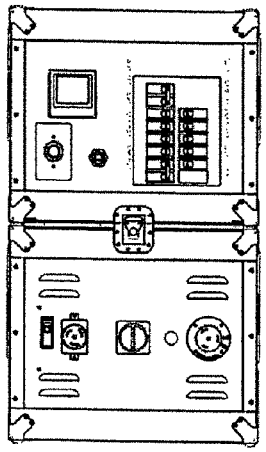
FIG. 23
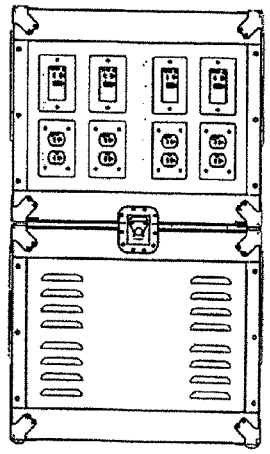
FIG. 25
FIG. 26
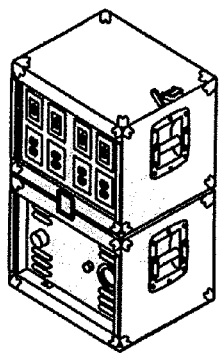
FIG. 27
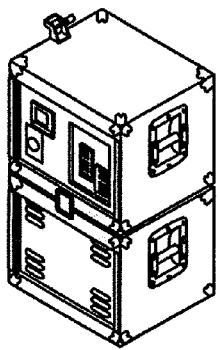

STACKABLE CUBE POWER DISTRIBUTION CENTER

This application claims priority to and benefit of U.S. Provisional Application Ser. No. 61/390,679 filed Oct. 7, 2010, which is incorporated herein in its entirety.

BACKGROUND OF THE INVENTION

Portable power distribution centers are known which are movable on wheels or by means of two wheeled dollies. However, known power distribution centers, particularly those which convert high voltage, such as 240 or 480 V voltage to 102 V voltage are typically quite heavy due to the large transformer and all of the associated wiring, switches, meters, and inlet and outlet connectors. Oftentimes it is necessary to move the power distribution centers over obstacles which require the power distribution centers to be lifted rather than simply rolled, and the tight tolerance locations may prevent machinery or other equipment to be used for the lifting, and would require manual lifting efforts which exceeds available human lifting capabilities or could cause injuries to persons attempting to lift the power distribution centers in such situations.

It would be an improvement in the art if an arrangement would be provided to allow heavy power distribution centers to be lifted easily and to reduce the potential for injury for those persons doing the lifting.

SUMMARY OF THE INVENTION

A power transformer and electrical current distribution device has a 480 V power inlet receptacle, at least one 120 V or 240 V power outlet receptacle, a transformer for transforming 480 V current to at least one of 120 V and 240 V current, and a first housing and a second housing each containing at least some of the 480 V inlet receptacle, the outlet receptacle and the transformer. A first part of an electrical connector is provided at the first housing, and a second part of an electrical connector at the second housing to mate with the first part of the electrical connector. The first housing part and the second housing part are electrically connected and disconnected at the electrical connector to permit transport of the power transformer and electrical current distribution device in at least two pieces.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 23 is a front view of the stackable cubes embodying the design of the present invention;

FIG. 24 is a left side view of the stackable cubes of FIG. 23;

FIG. 25 is a rear view of the stackable cubes of FIG. 23;

FIG. 26 is a top perspective view of the rear of the stackable cubes of FIG. 23;

FIG. 27 is a top perspective view of the front of the stackable cubes of FIG. 23;

DETAILED DESCRIPTION OF THE PREFERRED EMBODIMENTS

Figure 1:
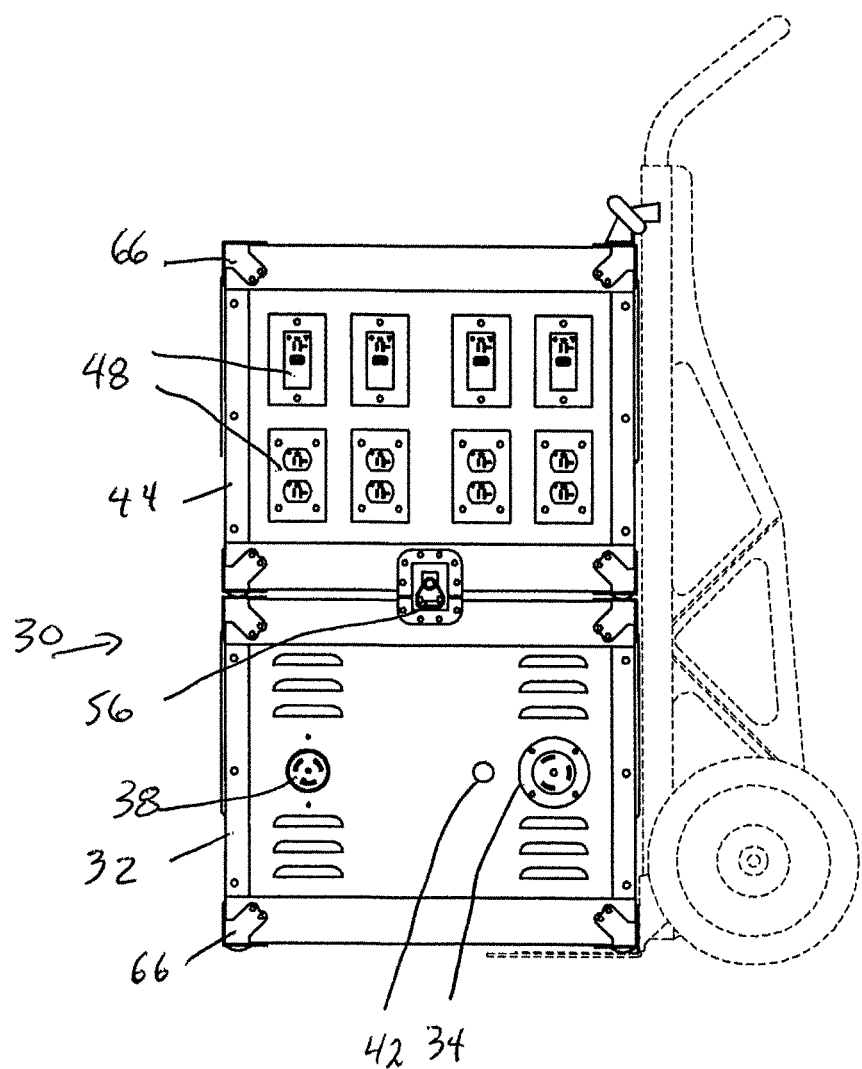
FIG. 1 is a front elevational view of a stackable cube power distribution center in place on a hand dolly shown in phantom for environmental purposes.
Figure 2:
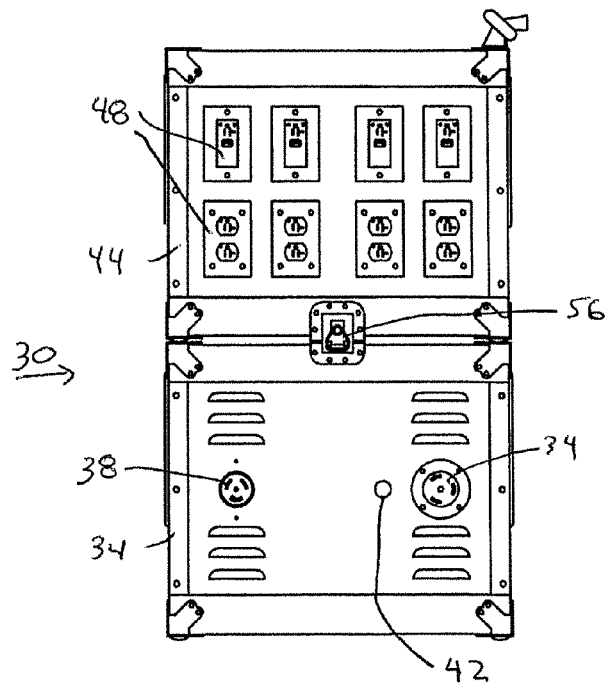
FIG. 2 is a front elevational view of the stackable cube power distribution center shown in FIG. 1, now in isolation.

FIGS. 1-4, 7-12, 16-17 and 22-27 show a two piece stackable cube electrical power transformer 30 in the stacked condition. The bottom cube 32 includes a receptacle 34 for inputting 3 phase 480 V electrical current to a transformer 36 (FIG. 29) in the cube. The bottom cube 32 also includes a 480 V outlet receptacle 38. A disconnect switch 40 is also provided to deenergize the 480 V outlet receptacle 38 and a lamp 42 displays when power is supplied to the cubes.

The top cube 44 includes circuit breakers 46 (FIG. 30) for a number of individual circuits with outlet receptacles 48 providing either 120 V or 240 V current. The top cube 44 also includes a power meter 50, such as a DIRIS A20 power meter. A receptacle 52 for an Ethernet connection is provided that is connected to a web relay device to control a number of circuits within the cube. A 240 V outlet receptacle 54 is shown below the power meter.

A latch 56 is provided to secure the top cube 44 to the bottom cube 32.

Figure 7:
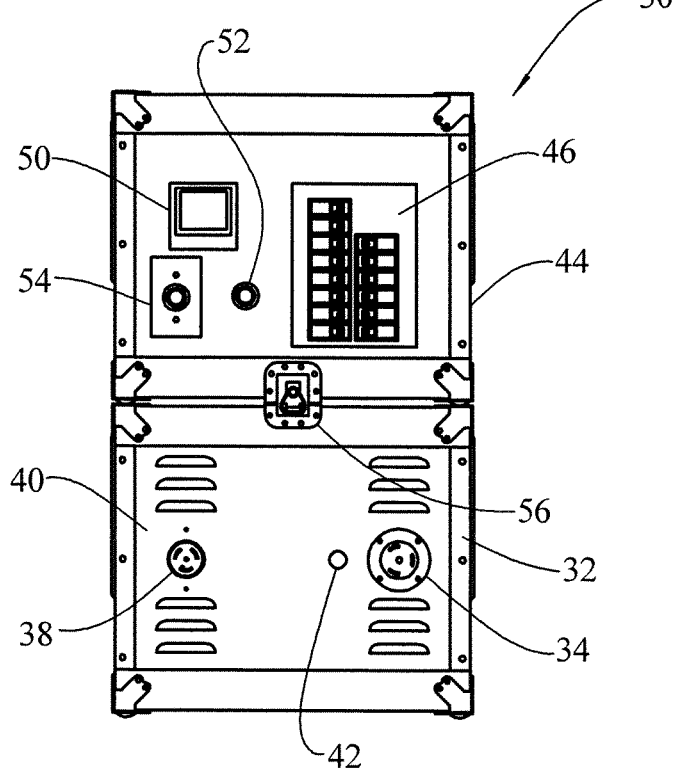
FIG. 7 is a front elevational view of a stackable cube electrical power transformer in the stacked condition and embodying the design of the present invention.
Figure 8:
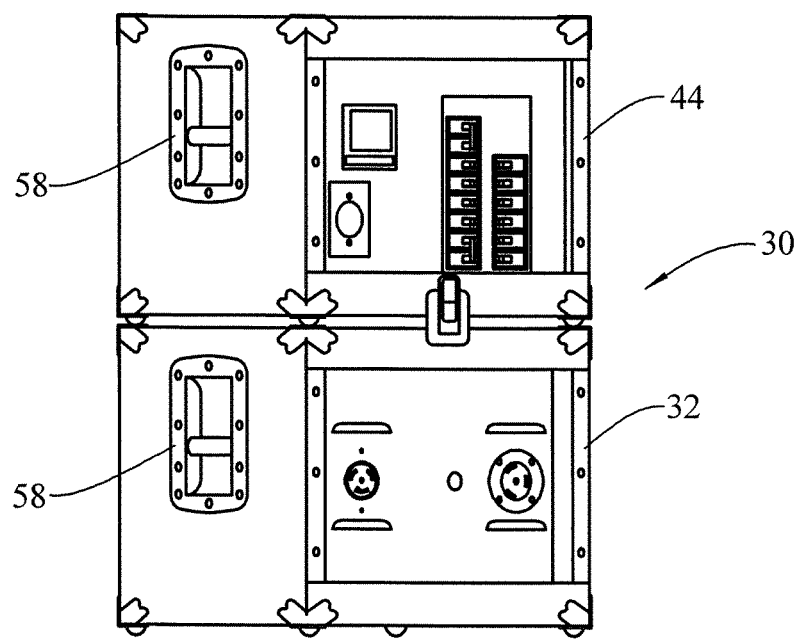
FIG. 8 is an elevational view of the cubes of FIG. 7 rotated 45 degrees to the right.

FIG. 8 shows the cubes of FIG. 7 rotated 45 degrees to the right, and showing handles 58 on the sides of the top and bottom cubes 32, 44.

Figure 9:
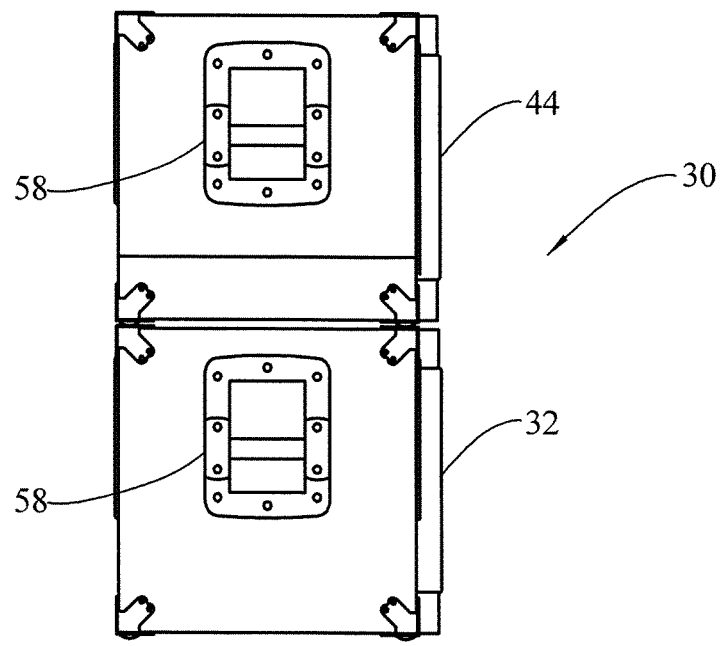
FIG. 9 is an elevational view of the cubes of FIG. 7 is rotated 90 degrees to the right.

FIG. 9 is rotated 90 degrees to the right from FIG. 7 and shows the handles 58 on both cubes 32, 44. Identical handles are provided on the opposite side.

Figure 3:
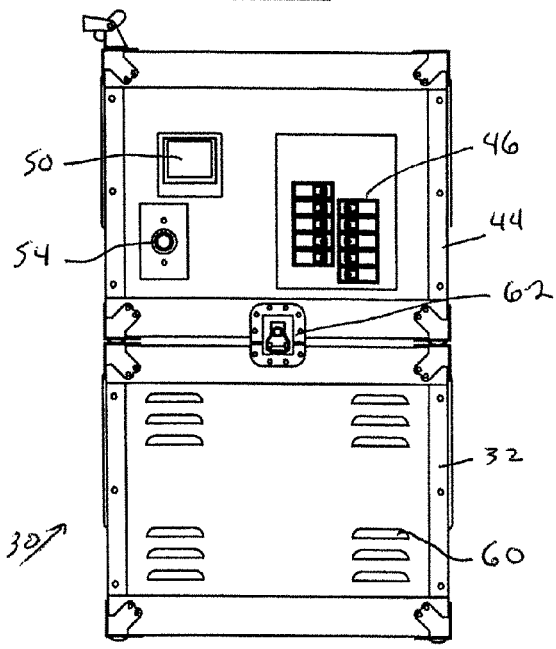
FIG. 3 is a rear elevational view of the stackable cube power distribution center shown in FIG. 1.
Figure 4:
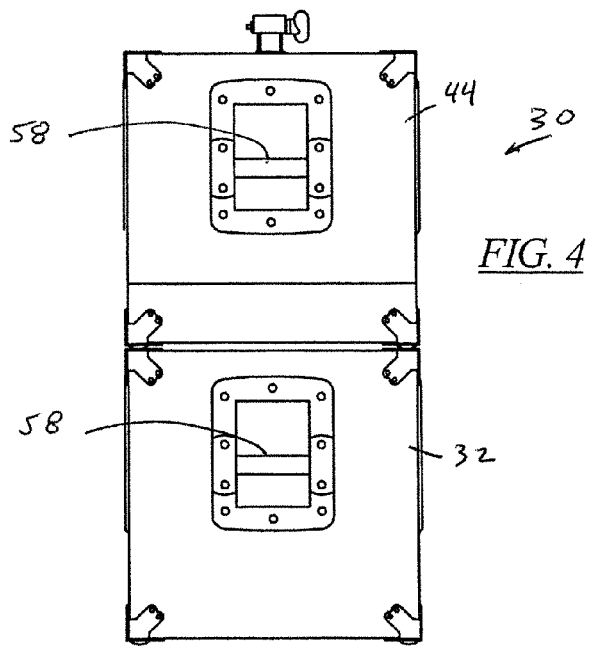
FIG. 4 is a left elevational view of the stackable cube power distribution center shown in FIG. 1, the right elevational view being a mirror image.
Figure 5:
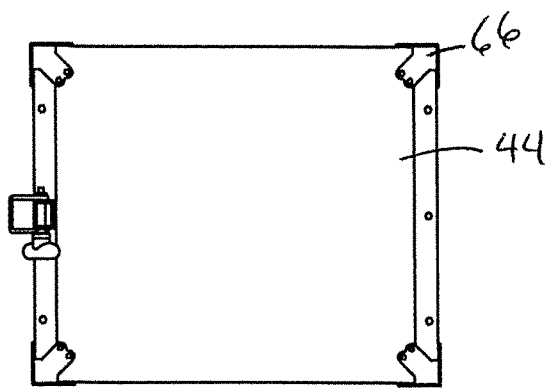
FIG. 5 is a plan view of the stackable cube power distribution center shown in FIG. 1.
Figure 6:
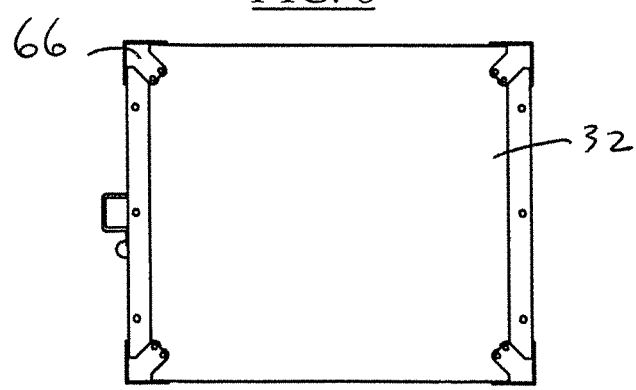
FIG. 6 is a bottom elevational view of the stackable cube power distribution center shown in FIG. 1.
Figure 10:
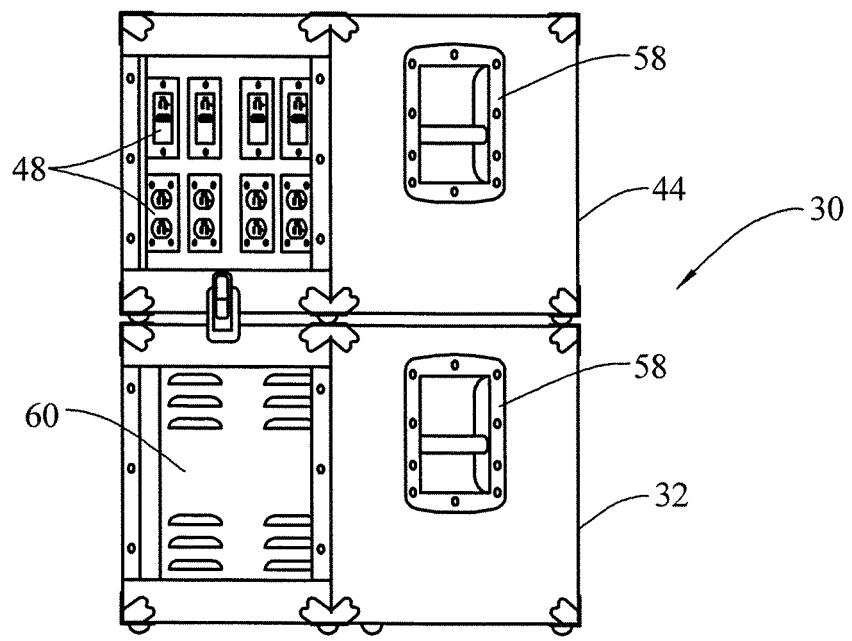
FIG. 10 is an elevational view of the cubes of FIG. 9 rotated 45 degrees to the right.
Figure 11:
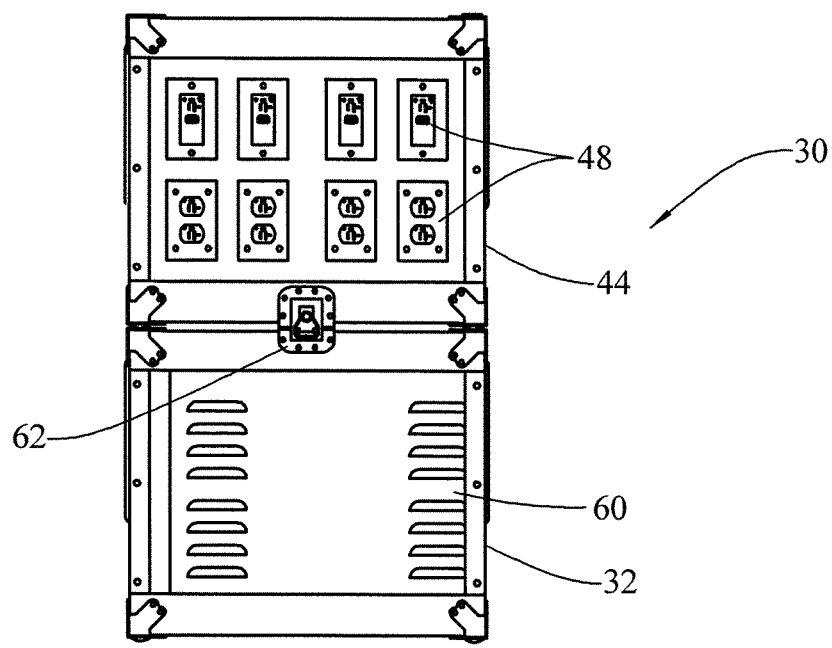
FIG. 11 is an elevational view of the cubes of FIG. 10 rotated 45 degrees to the right.

FIG. 10 shows the cubes 32, 44 rotated 45 degrees to the right of FIG. 3 and in combination with FIG. 11, shows the receptacles 48 provided on the top cube 44. A plurality of duplex outlets and single outlets are provided on the top cube 44. The bottom cube 32 has ventilation openings 60 provided in the wall. A second latch 62 is provided for securing the top cube 44 to the bottom cube 32.

Figure 12:
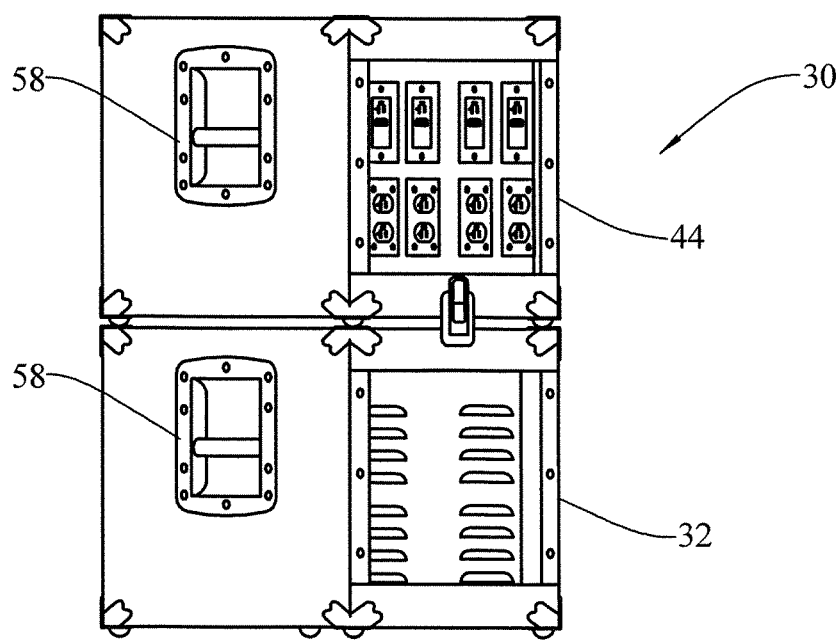
FIG. 12 is an elevational view of the cubes of FIG. 11 rotated 45 degrees to the right.

FIG. 12 shows the cubes 32, 44 rotated 45 degrees to the right from FIG. 11, and shows the handles 58 on the opposite side of the cubes.

Figure 13:
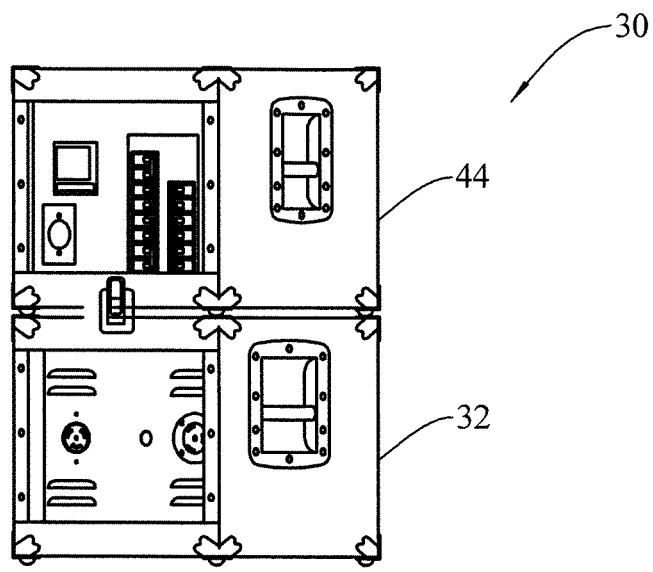
FIG. 13 is an elevational view of the cubes of FIG. 13 rotated 90 degrees to the right.

FIG. 13 shows the cubes 32, 44 rotated 90 degrees to the right from FIG. 12, partially showing the side of the cubes exposed in FIG. 7.

Figure 14:
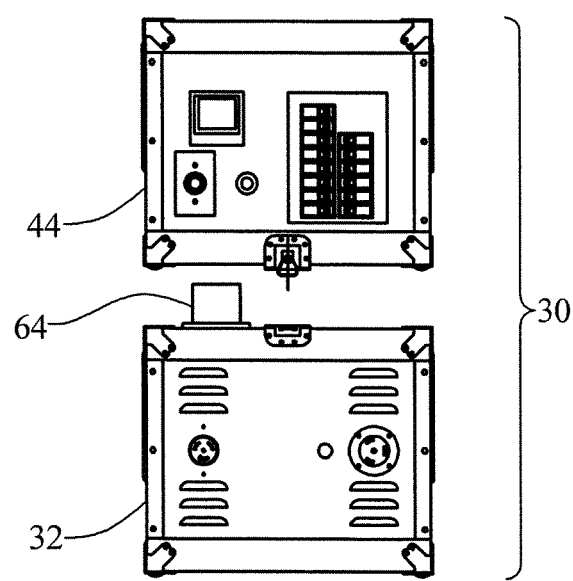
FIG. 14 is an elevational view of the two cubes of FIG. 7 in a position where the top cube is removed from the bottom cube.

FIG. 14 shows the two cubes 32, 44 in a position where the top cube is removed from the bottom cube. A connector 64, such as a Hubble 460 connector is exposed, extending upwardly from the bottom cube 32. This connector 64 is received in a mating receptacle in the upper cube to transmit 120/240 V electrical current from the bottom cube to the top cube.

Figure 15:
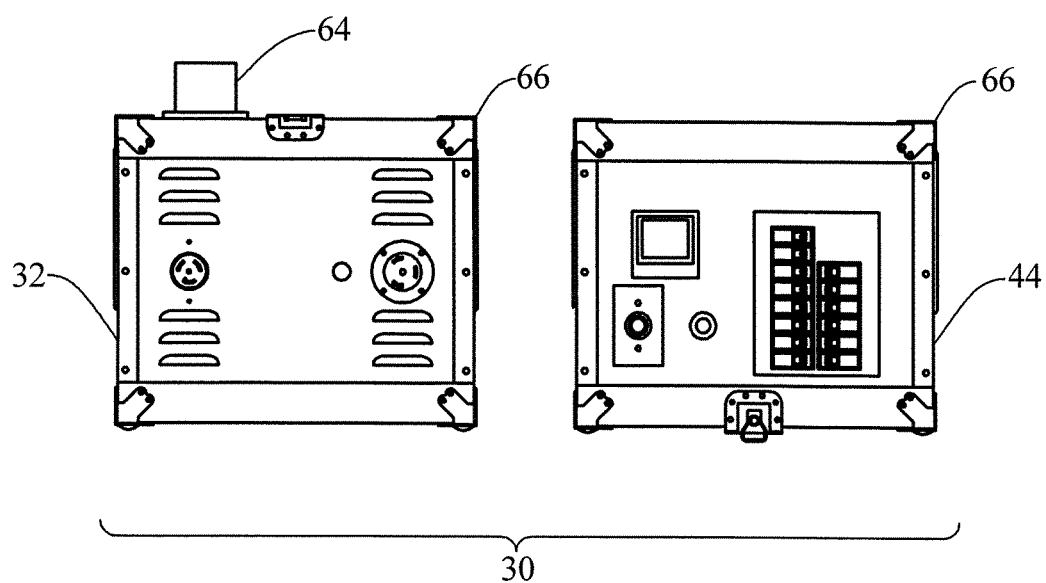
FIG. 15 is an elevational view of the two cubes of FIG. 7 in a disassembled state sitting side by side.

FIG. 15 shows the two cubes 32, 44 in a disassembled state sitting side by side. The two cubes 32, 44 have corner reinforcements 66 to strengthen the cube structure and to prevent damage to the cube housings.

Figure 29:
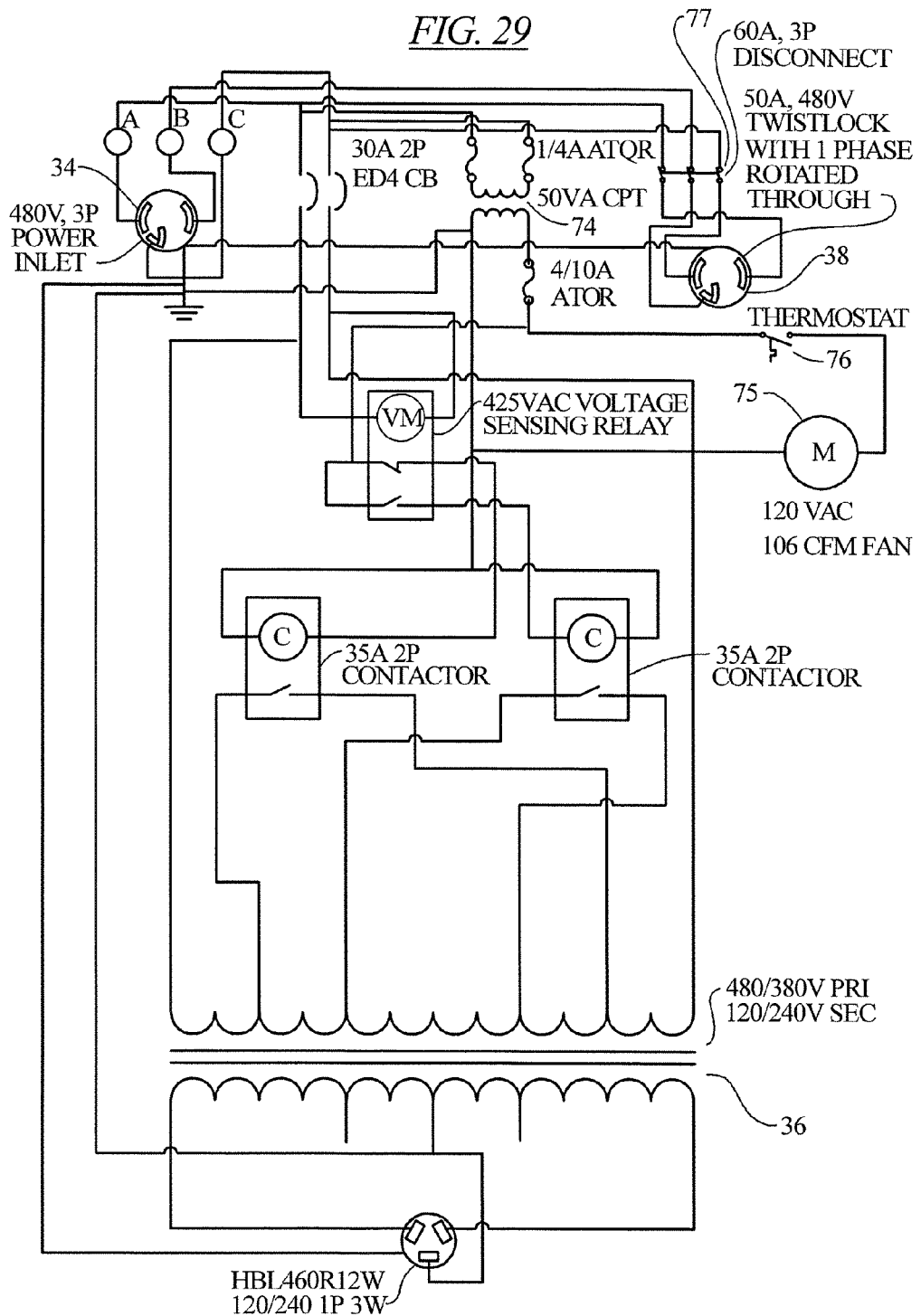
FIG. 29 is an electrical schematic of the devices located in the bottom cube.

FIG. 29 is an electrical schematic of the devices which may be located in the bottom cube 32. The power inlet 34 is connected through a circuit breaker to a voltage sensing relay which transmits power to one of two contactors to provide current to selected legs of a transformer 36 to provide either 120 V or 240 V power output. This power output is provided at the Hubble 460R12W connector 64.

Another current transformer 74 is provided to make 120 V current available for a cooling fan 75 which is controlled by a thermostat 76. A 480 V outlet 38 is provided, protected by a disconnect 77.

Figure 30:
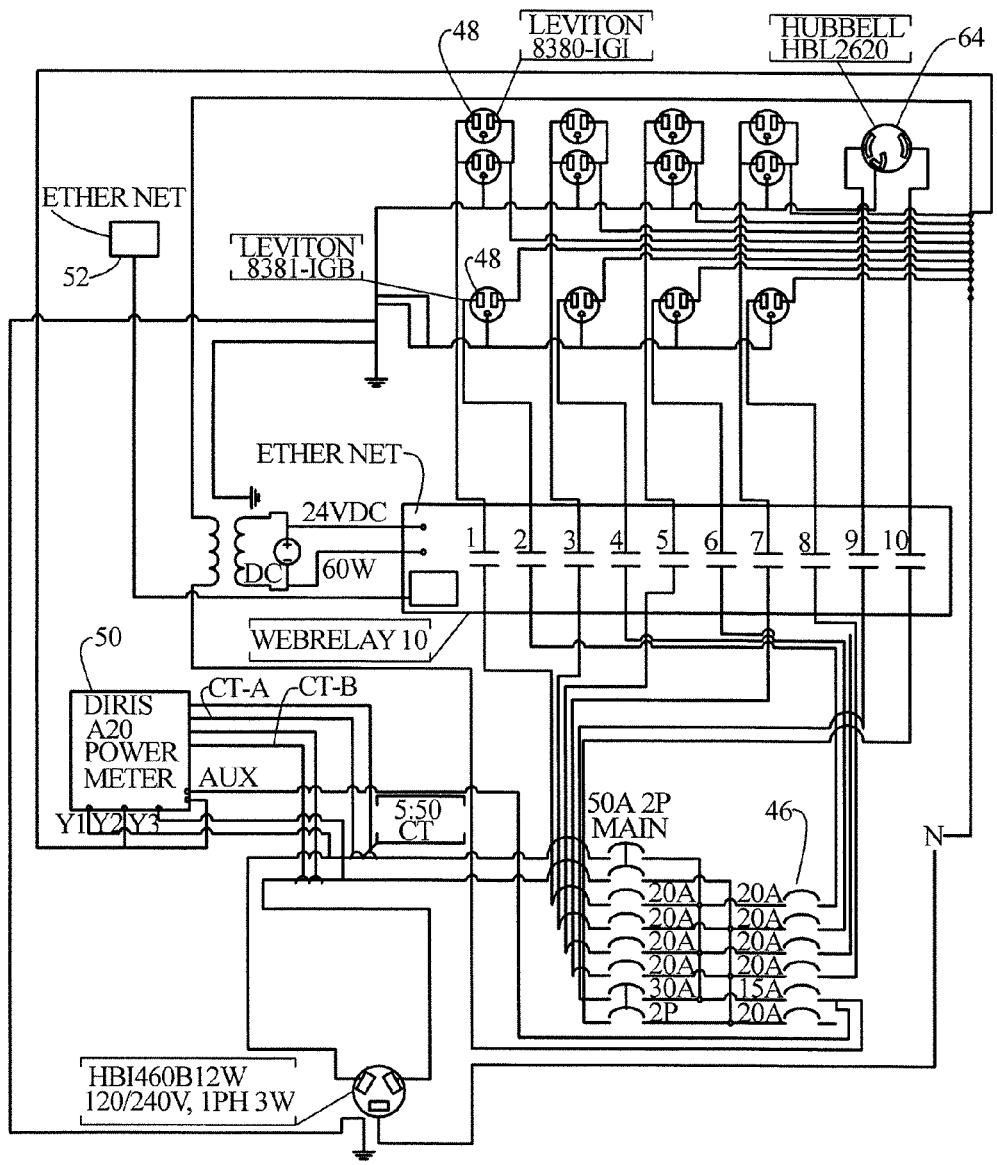
FIG. 30 is an electrical schematic of the devices located in the top cube; and C

FIG. 30 is an electrical schematic of the devices which may be located in the top cube 44. The power inlet is the Hubble 460B12W connector 64 which is connected to the power meter 50, and also through a number of circuit breakers to the power outlet receptacles 48 for providing 120 V or 240 V current. The Ethernet connection 52 operates through a 10 position relay, which permits remote control (through the internet) of the power status of each of the power outlet receptacles 48. The web relay is powered via a 24 V transformer. Setup procedures for the web relay are described in the provisional application Ser. No. 61/390,679 filed Oct. 7, 2010 which is incorporated herein by reference.

Figure 31:
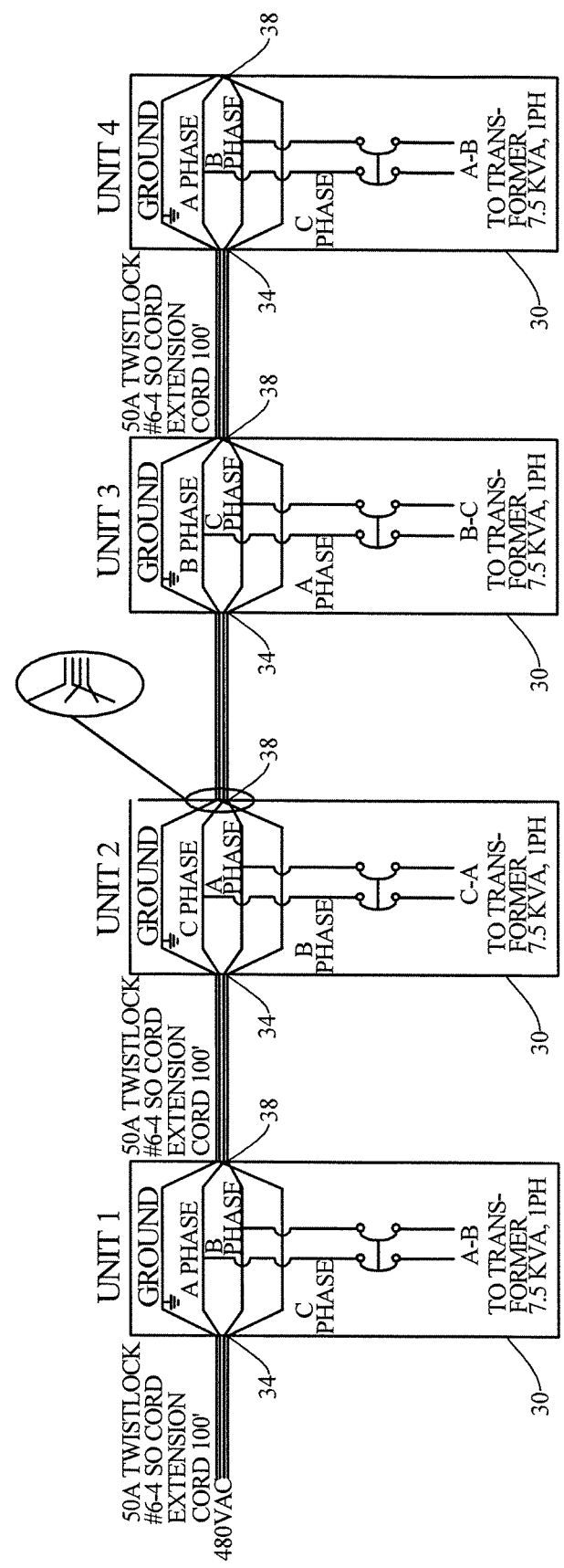
FIG. 31 is an electrical schematic demonstrating how several units of cubes can be connected together via the 480 V outlet receptacle in the bottom cube.

FIG. 31 is an electrical schematic demonstrating how several units of cubes 32, 44 can be connected together via the 480 V outlet receptacle 38 in the bottom cube.

Figure 16:
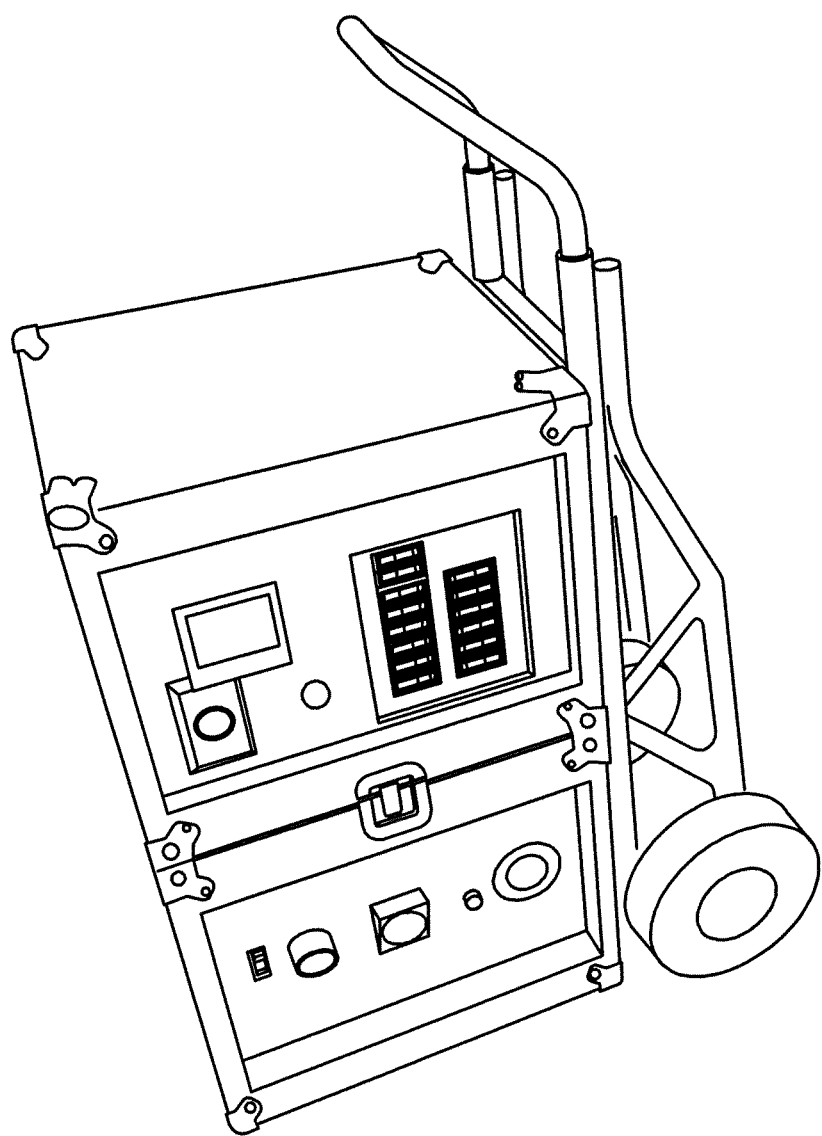
FIG. 16 is a front top perspective view of two sets of cubes being transported by hand dollies for environmental purposes.

FIG. 16 shows two sets of cubes 32, 44 being transported by hand dollies 80.

Figure 17:
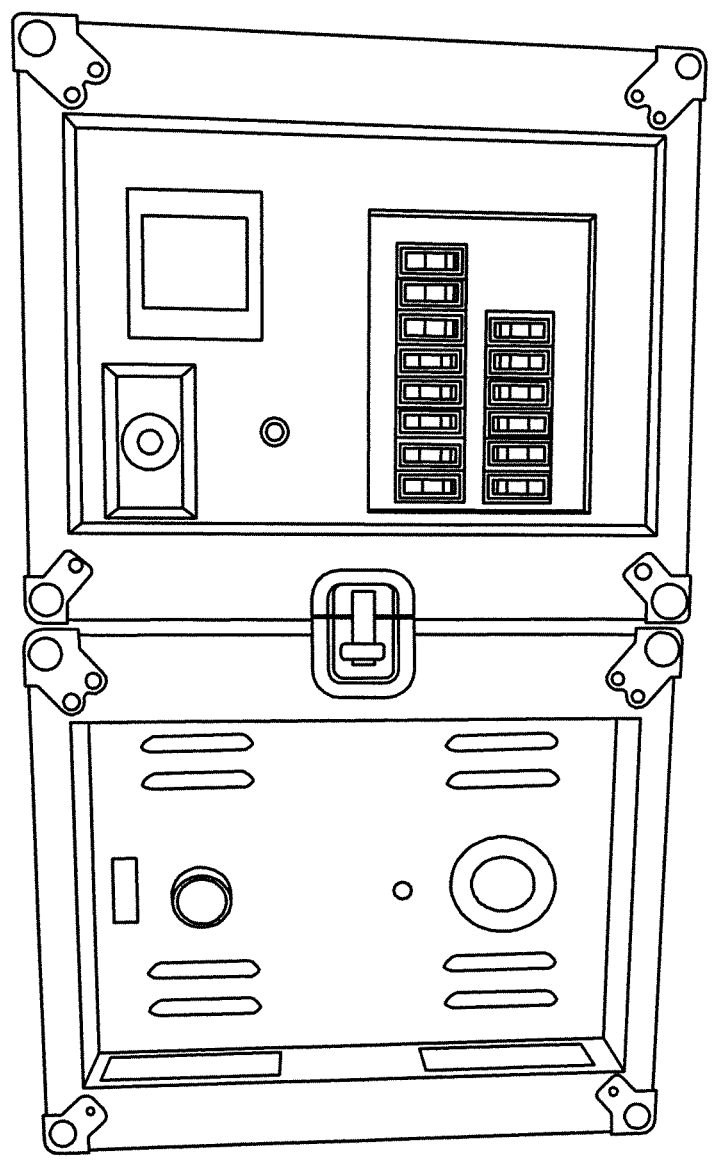
FIG. 17 is a front elevational view of the cubes of FIG. 16.

FIG. 17 shows one set of two stacked cubes 32, 44 in an arrangement similar to FIG. 7.

Figure 18:
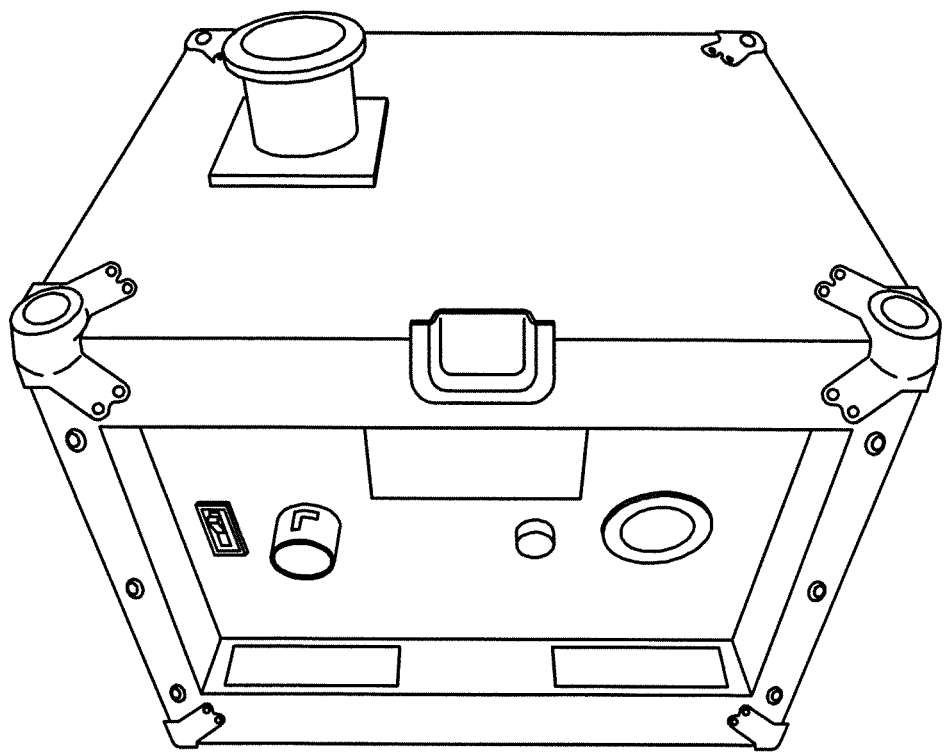
FIG. 18 is a front top elevational view of the bottom cube of FIG. 16.

FIG. 18 is a top perspective view of a bottom cube 32 showing the power connector 64 extending from the top of the bottom cube.

Figure 19:
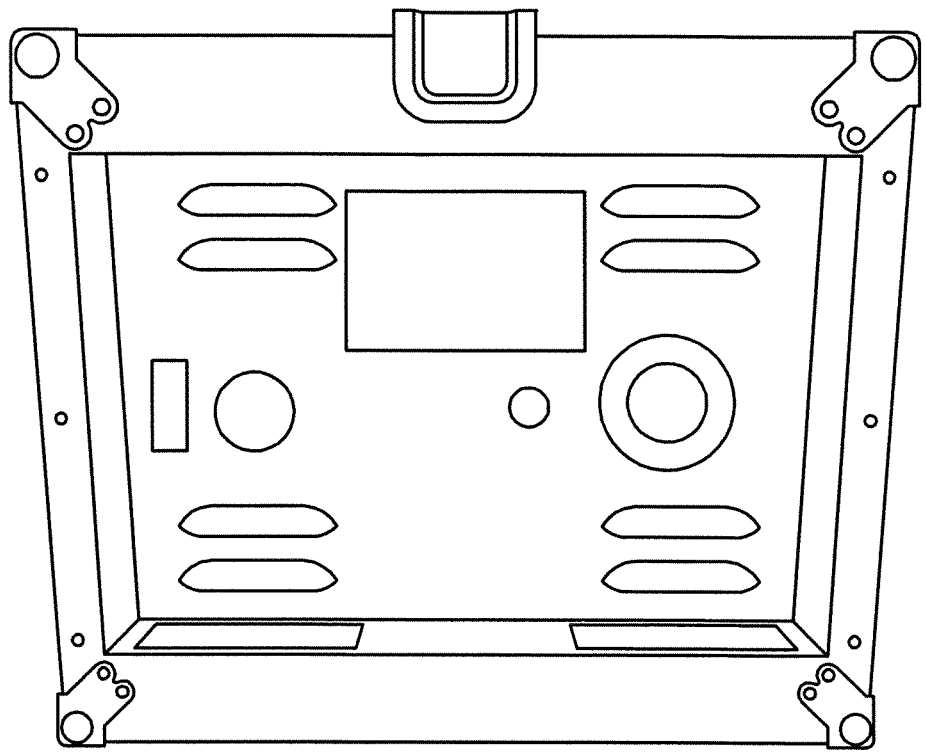
FIG. 19 is a front elevational view of the bottom cube of FIG. 18.

FIG. 19 shows the front side of the bottom cube 32.

Figure 20:
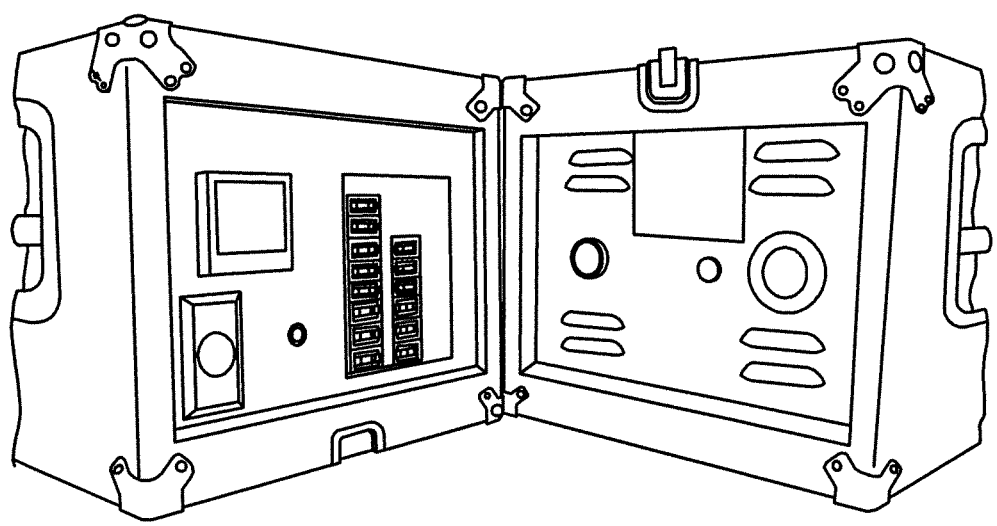
FIG. 20 is a front perspective view of the top and bottom cubes of FIG. 16 in a disassembled state sitting side by side and angles toward one another.
Figure 22:
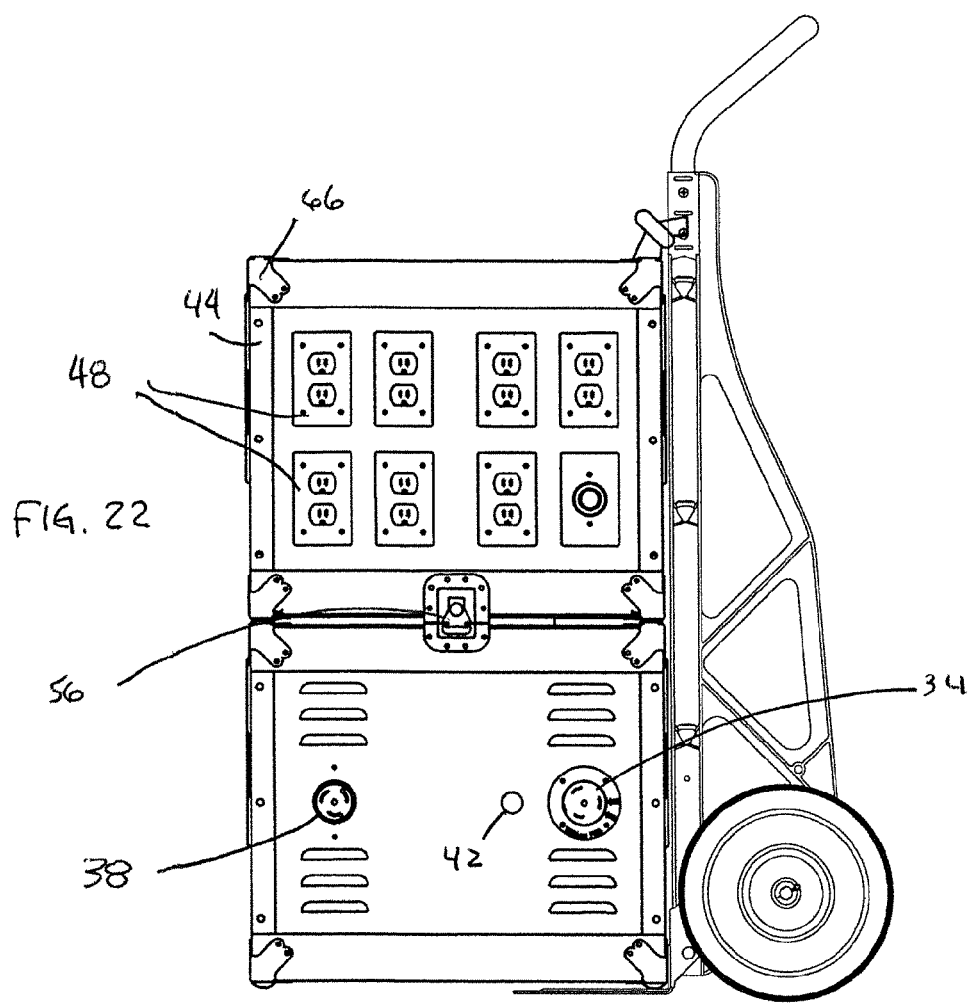
FIG. 22 is a front view of the stackable cubes embodying the design of the present invention as positioned on a two wheel cart shown for environmental purposes.
Figure 21:
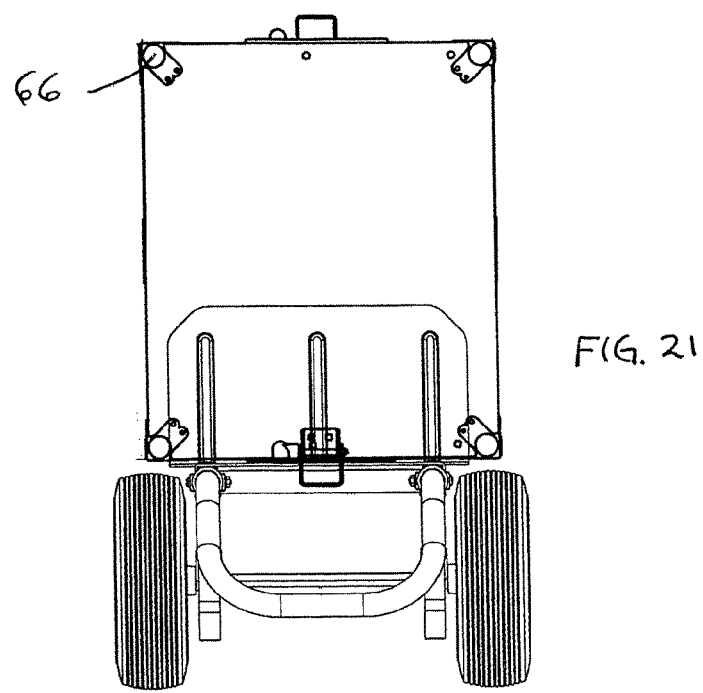
FIG. 21 is a bottom view of the stackable cubes embodying the design of the present invention as positioned on a two wheel cart shown for environmental purposes.
Figure 28:
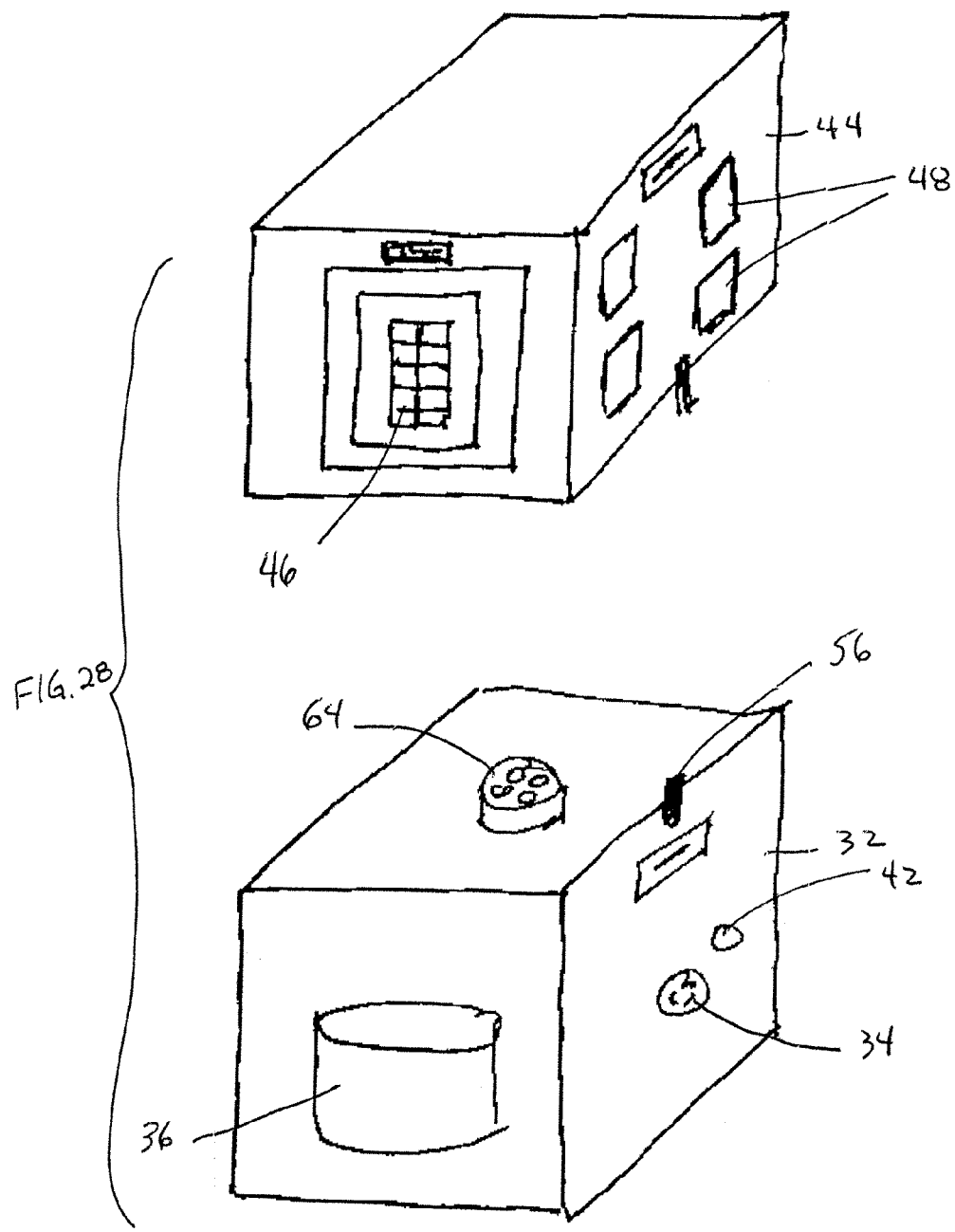
FIG. 28 is a top perspective view of the stackable cubes embodying the design of the present invention in a position where the top cube is elevated above the bottom cube.

FIG. 20 shows a top 44 and bottom 32 cube sitting side by side.

The two cubes 32, 44 provide a power transformer 30 of accepting three phase 480 V electrical current and providing outlets 38, 48 for 480 V, 240 V and 120 V current. The unit 30 is compact to be transported on a hand dolly, and is separable into two pieces 32, 44 to allow for easier transport of the transformer 36. In a commercial embodiment of the invention, the weight of the bottom cube 32 is about 150 pounds and the weight of the top cube 44 is about 52 pounds. The hand dolly weighs about 22 pounds. The disassembled pieces 32, 44 can easily be transported by two persons to lift and move the power transformer and power distribution device 30 into areas of limited access, such as through access ports in passages of power plants, industrial settings, submarines or ships, and similar locations.

As is apparent from the foregoing specification, the invention is susceptible of being embodied with various alterations and modifications which may differ particularly from those that have been described in the preceding specification and description. Different components may be located in different ones of the two cubes and may be arranged on different faces of the two cubes as shown in a few exemplary embodiments in the drawings. Also, different voltages can be transformed and provided at different outlets than those described. The voltages can be transformed higher or lower from the inlet to the outlet receptacles. What is important is that the total weight of the various components is divided and distributed between the multiple pieces of the distribution center, which in the embodiments is shown as being two pieces, however, more than two pieces are also contemplated. It should be understood that I wish to embody within the scope of the patent warranted hereon all such modifications as reasonably and properly come within the scope of my contribution to the art.

The invention claimed is:

1. A power transformer and electrical current distribution device comprising:
   a 480 V power inlet receptacle,
   at least one of a 120 V and 240 V power outlet receptacle,
   a transformer for transforming 480 V current to at least one of 120 V and 240 V current,
   a first housing containing at least one of the 480 V inlet receptacle, the outlet receptacle and the transformer,
   a second housing containing at least one of the 480 V inlet receptacle, the outlet receptacle and the transformer,
   a first part of an electrical connector at the first housing, and
   a second part of an electrical connector at the second housing designed to mate with the first part of the electrical connector,
   wherein the first housing part and the second housing part can be electrically connected at the first and second parts of the electrical connector, and can be disconnected at the electrical connector to permit transport of the power transformer and electrical current distribution device in at least two pieces.

2. A power transformer and electrical current distribution device comprising:
- a power inlet receptacle for a first predetermined voltage,
- at least one power outlet receptacle for a second, different predetermined voltage,
- a transformer for transforming the first predetermined voltage to the second predetermined voltage,
- a first housing containing at least one of the inlet receptacle, the outlet receptacle and the transformer,
- a second housing containing at least one of the inlet receptacle, the outlet receptacle and the transformer,
- a first part of an electrical connector at the first housing, and
- a second part of an electrical connector at the second housing designed to mate with the first part of the electrical connector,
- wherein the first housing part and the second housing part can be electrically connected at the first and second parts of the electrical connector, and can be disconnected at the electrical connector to permit transport of the power transformer and electrical current distribution device in at least two pieces.

* * * * *